United States Patent Office 3,338,945
Patented Aug. 29, 1967

3,338,945
β,β'-BIS(SUBSTITUTED SULFONYLTHIO)
COMPOUNDS
Joseph E. Dunbar, Midland, Mich., assignor to The Dow Chemical Company, Midland, Mich., a corporation of Delaware
No Drawing. Filed June 21, 1965, Ser. No. 465,756
12 Claims. (Cl. 260—453)

This is a continuation-in-part of my copending applications Ser. Nos. 319,494 filed Oct. 28, 1963 and 319,528 filed Oct. 28, 1963, both now abandoned.

The present invention is directed to compounds corresponding to the formula

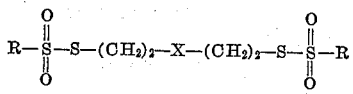

In this and succeeding formulae, R represents lower alkyl, phenyl, benzyl, halophenyl, methoxyphenyl, lower alkylphenyl or lower alkyl-halophenyl and X represents O, S, SO, SO$_2$, N—R$_1$ and N—R$_1$·R$_2$, wherein R$_1$ represents hydrogen, alkyl, phenyl, substituted phenyl, cyclohexyl, bicyclo[2.2.1]-5-hepten-2-ylmethyl or cyclooctyl and R$_2$ represents a hydrogen halide acid such as hydrogen chloride, hydrogen bromide or hydrogen iodide. In the present specification and claims, the expression "alkyl" is employed to designate an alkyl group containing from 1, to 2, to 3, to 4, to 5 and so forth up to and including 12 carbon atoms; "lower alkyl" and "lower alkoxy" are employed to designate an alkyl group containing from 1, to 2, to 3, to 4 carbon atoms, inclusive, and substituted phenyl refers to halophenyl, lower alkyl phenyl and lower alkoxyphenyl. These compounds are liquid or crystalline solid materials which are soluble in varying degrees in many common organic solvents and water. The compounds are useful as parasiticides and are adapted to be employed for the control of a number of insect, worm, bacterial, plant and fungal organisms such as roundworms, beetles, mites, roaches, houseflies, ticks, aphids, blight, *Pseudomonas aeruginosa*, *Staphylococcus aureus*, *Salmonella typhosa*, *Aerobacter aerogenes*, *Asperigillus terreus*, *Pullularia pullulans* and *Rhizopus nigricans*.

The novel bis(thiosulfonyl) compounds of the present invention are prepared by reacting a dihalo-compound corresponding to the formula:

Z—(CH$_2$)$_2$—X—(CH$_2$)$_2$—Z wherein Z represents halogen, with an alkali metal salt of a thiosulfonic acid corresponding to the formula:

Alkali metal —S—SO$_2$—R

The reaction conveniently is carried out in an organic liquid as reaction medium such as dimethylformamide, acetone, ethanol, methanol, aqueous methanol, aqueous acetone or aqueous ethanol. The amounts of the reagents to be employed and the reaction conditions are not critical, some of the desired product being obtained at once when employing any proportion of the reactants. However, the reaction consumes the reactants in molecular proportions of two moles of alkali metal salt of the thiosulfonic acid for every mole of the dihalo-compound consumed by the reaction. Representative thiosulfonic acid salts include sodium 2,4-dimethylbenzenethiosulfonate, potassium 4-bromo-2,5-dimethylbenzenethiosulfonate, potassium 5-chloro-2,4-dimethylbenzenethiosulfonate, sodium 2,4,6-trimethylbenzenethiosulfonate, and sodium 4-chloro-2-ethylbenzenethiosulfonate. The reaction takes place smoothly at temperatures at which the alkali metal halide of reaction is formed and conveniently at temperatures between 25° and 150° C. In a preferred procedure, the reaction is carried out at temperatures between 60 and 120° C. In such a preferred method it is oftentimes convenient to operate at the boiling temperature of the reaction mixture and under reflux. Cessation in the formation of the halide of reaction is evidence of completion of the reaction.

In carrying out the reaction, the reactants are mixed and contacted together in any convenient fashion and the resulting mixture maintained for a period of time in the reaction temperature range to insure completion of the reaction. Following the reaction, the reaction mixture is processed by conventional procedures to obtain the desired product. In one such procedure, the reaction mixture is filtered while hot to remove the halide of reaction, and the filtrate is then cooled. During the cooling the desired product separates in the filtrate as a crystalline solid or an organic oil and is collected by decantation or filtration. This product can be employed in pesticidal compositions, or further purified by usual procedures such as washing and recrystallizing from common organic solvents. In another convenient procedure, the organic reaction medium can be removed by evaporation under reduced pressure, leaving the desired product as a residue. This residue can then be further purified as described heretofore.

The N,N-bis[β-(substituted sulfonylthio)-ethyl]amine hydrohalides of the present invention can also be prepared by reacting together an N,N-bis[β-substituted sulfonylthio)ethyl]amine, produced as described in the preceding paragraphs, and gaseous hydrogen halide such as hydrogen chloride or hydrogen bromine. The reaction is conveniently carried out in an organic solvent such as ether, carbon tetrachloride or chloroform. The amounts of the reagents to be employed are not critical, some of the desired product being obtained at once when employing any proportion of the reactants. However, optimum yields are conveniently obtained when excess hydrogen halide is employed. The reaction takes place smoothly at temperatures between —50° and 80° C. The crystalline hydrohalide product is separated and purified by the procedures as previously described.

The following examples merely illustrate the present invention and are not to be construed as limiting.

*Example 1.*—β,β'-*bis(methylsulfonylthio)diethyl ether*

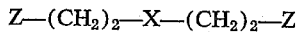

β,β'-Dibromodiethyl ether (69.6 grams; 0.300 mole) and potassium methanethiosulfonate (90.2 grams; 0.600 mole) were dispersed in 120 milliliters of dimethylformamide. The resulting mixture was heated with stirring at a temperature of 95° C. for one hour. The mixture was cooled to room temperature, filtered and diluted with 1800 milliliters of ice water. During the dilution, the β,β'-bis(methylsulfonylthio)diethyl ether product precipitated as a crystalline solid and was collected by filtration and recrystallized from methanol. The white, recrystallized product melted at 71.5 to 72.5° C. and had carbon, hydrogen and sulfur contents of 24.65, 4.92 and 43.70 percent, respectively, as compared to theoretical contents of 24.48, 4.79 and 43.56 percent.

*Example 2.*—β,β'-*bis(p-tolylsulfonylthio)diethyl ether*

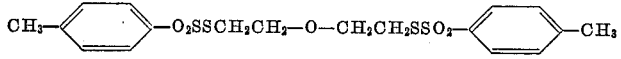

β,β'-Dibromodiethyl ether (17.4 grams; 0.0750 mole) and potassium p-toluenethiosulfonate (34.0 grams; 0.150 mole) were dispersed in 35 milliliters of dimethylformamide and the resulting mixture heated at 95° C. for thirty minutes. The reaction mixture was cooled, filtered and the filtrate diluted with 600 milliliters of ice water. Following the dilution, an oil separated in the diluted mixture. This oil was isolated by decantation, washed with water and cooled, while remaining in contact with the wash water for several hours. During the cooling, the β,β'-bis(p-tolylsulfonylthio)diethyl ether product solidified. The solid material was collected on a filter and then dissolved in hot methanol. The hot solution was treated with activated charcoal, filtered and allowed to cool. The crystalline product thus obtained was once again recrystallized from methanol. The white, recrystallized product melted at 60° to 61° C. and had carbon, hydrogen and sulfur contents of 48.48, 4.79 and 28.84 percent, respectively, as compared with theoretical contents of 48.40, 4.97 and 28.71 percent.

*Example 3.—β,β'-bis(p-bromophenylsulfonylthio) diethyl ether*

β,β'-Dibromodiethyl ether (11.6 grams; 0.0500 mole) and potassium p-bromobenzenethiosulfonate (29.1 grams; 0.100 mole) were dispersed in 300 milliliters of ethanol and heated at the boiling temperature and under reflux for sixteen hours. Following the heating period, the hot reaction mixture was filtered to remove the potassium bromide of reaction. The filtrate was then distilled under subatmospheric pressure to remove the ethanol from the β,β'-bis(p-bromophenylsulfonylthio)diethyl ether product which remained as an oil. This oil crystallized when triturated with diethyl ether. The crystalline material was then twice recrystallized from isopropanol. The recrystallized product melted at 71° to 74° C. and had carbon and hydrogen contents of 33.37 and 2.87 percent, respectively, as compared to theoretical contents of 33.34 and 2.80 percent.

*Example 4.—Bis[2-(p-bromophenylsulfonylthio)ethyl]sulfide*

β,β'-Dibromodiethyl sulfide (14.9 grams; 0.0600 mole) and potassium p-bromobenzenethiosulfonate (35.0 grams; 0.120 mole) were dispersed in 350 milliliters of ethanol and the resulting mixture heated with stirring at the boiling point and under reflux for 3.5 hours. The hot reaction mixture was then filtered to remove the potassium bromide of reaction. The filtrate was allowed to cool to room temperature whereupon the bis[2-(p-bromophenylsulfonylthio)ethyl] sulfide product precipitated as a crystalline solid. The crystalline solid, when recrystallized from isopropanol, melted at 89°–91° C. and had carbon, hydrogen and sulfur contents of 32.55, 2.56 and 27.11 percent, respectively, as compared with theoretical contents of 32.44, 2.72 and 27.06 percent.

*Example 5.—Bis[2-(p-methoxyphenylsulfonylthio)ethyl]sulfide*

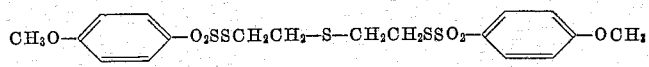

β,β'-Dibromodiethyl sulfide (18.6 grams; 0.075 mole) and potassium p-methoxybenzenethiosulfonate (36.4 grams; 0.150 mole) were dispersed in 350 milliliters of ethanol and the resulting mixture heated with stirring at the boiling temperature and under reflux for a period of four hours. After the heating period the hot reaction mixture was treated in the same manner taught in Example 4, to yield the bis[2-(p-methoxyphenylsulfonylthio)ethyl]sulfide product as an oil which was separated from the reaction mixture by decantation. The separated oil product was dissolved in methylene chloride and dried over anhydrous magnesium sulfate. Removal of the drying agent by filtration and the solvent by evaporation in vacuo left the product as an oil having a refractive index n/D of 1.6251 at 25° C. and carbon, hydrogen and sulfur contents of 43.74, 4.47 and 32.15 percent, respectively, as compared to the theoretical contents of 43.70, 4.48 and 32.41 percent.

*Example 6.—N,N-bis[β-(ethylsulfonylthio)ethyl]-tert.-butylamine*

Bis-(2-chloroethyl-tert.-butylamine (14.9 grams; 0.0753 mole) and potassium ethanethiosulfonate (24.8 grams; 0.151 mole) were dispersed in 250 milliliters of ethanol. The resulting reaction mixture was heated with stirring under reflux for one hour. At the termination of the reaction period, the hot reaction mixture was filtered to remove the halide of reaction. The filtrate was then allowed to cool to room temperature. During the cooling period the N,N - bis [β-(ethylsulfonylthio)ethyl]-tert.-butylamine product separated out as a crystalline solid. This solid material was recrystallized from isopropanol and found to melt at 49–51° C. and to have carbon, hydrogen and nitrogen contents of 38.23, 7.22 and 3.66 percent, respectively, as compared to the theoretical contents of 38.17, 7.21 and 3.71 percent.

*Example 7.—N,N-bis[β-(4-bromophenylsulfonylthio)-ethyl]-tert.-butylamine*

6.6 grams (0.033 mole) of bis(2-chloroethyl)-tert.-butylamine and 19.4 grams (0.066 mole) of potassium p-bromobenzenethiosulfonate were dispersed in 200 milliliters of ethanol. The resulting mixture was heated with stirring and under reflux at the boiling temperature for one hour. The hot reaction mixture was treated as described in Example 1 to obtain the N,N-bis[β-(4-bromophenylsulfonylthio)ethyl]-tert.-butylamine product which was collected by filtration and recrystallized from ethanol. The recrystallized product melted at 119.5°–121.5° C. and had carbon, hydrogen and nitrogen contents of 38.19, 4.12 and 2.22 percent, respectively, as compared with the theoretical contents of 38.04, 3.99 and 2.22 percent.

*Example 8.—N,N-bis[β-(p-tolylsulfonylthio)ethyl]-tert.-butylamine hydrochloride*

A mixture of bis(2-chloroethyl)-tert.-butylamine hydrochloride (11.7 grams; 0.0500 mole), potassium p-toluenethiosulfonate (22.6 grams; 0.100 mole) and 250 milliliters of ethanol was heated at the boiling temperature with stirring under reflux for one and one-half hours. The hot reaction mixture was then handled as set forth in Example 1 to yield the N,N-bis[β-(p-tolylsulfonylthio)ethyl]-tert.-butylamine hydrochloride product as a crystalline solid. This solid material was recrystallized from ethanol and found to melt at 151.5°–153° C. and to have carbon, hydrogen and nitrogen contents of 49.01, 6.00 and 2.79 percent, respectively, as compared to the theoretical contents of 49.09, 5.99 and 2.60 percent.

*Example 9.—Bis[2-(p-tolylsulfonylthio)ethyl]sulfoxide*

β,β'-Dibromodiethyl sulfoxide (8.98 grams; 0.0340 mole) and potassium p-toluenethiosulfonate (15.2 grams; 0.0670 mole) were dispersed in 75 milliliters of ethanol. The ethanol reaction mixture was heated at the boiling temperature and under reflux for 2½ hours, at which time the hot reaction mixture was filtered to remove potassium bromide. The filtrate, upon cooling, yielded an oil which crystallized upon standing in the refrigerator for several days. These crystals were recrystallized from ethanol three times to give the bis[2-(p-tolylsulfonylthio)ethyl]sulfoxide product which melted at 82–85° C. and had carbon, hydrogen and sulfur contents of 45.30, 4.56 and 33.48 percent, respectively, as compared to the theoretical contents of 45.16, 4.63 and 33.49 percent.

*Example 10.—Bis[2-(3,4-dichlorophenylsulfonylthio)-ethyl] sulfone*

Potassium 3,4 - dichlorobenzenethiosulfonate (22.1 grams; 0.0786 mole) and bis-(2-bromoethyl)sulfone (11.0 grams; 0.0393 mole) were dispersed in 250 milliliters of acetonitrile. The resulting mixture was heated at the boiling temperature, with stirring and under reflux for 22 hours. Following the reaction period, the potassium bromide by-product which precipitated during the reflux period was removed from the reaction mixture by filtration. Thereafter the filtered reaction mixture was subjected to evaporation under reduced pressure to remove the low boiling constituents and to obtain the product as a viscous oil which crystallized upon standing. This crystalline product was recrystallized from methanol to give the bis[2-(3,4-dichlorophenylsulfonylthio)ethyl] sulfone product as a crystalline solid melting at 139–140° C. and having carbon, hydrogen and chlorine contents of 32.10, 2.49 and 23.52 percent, respectively, as compared to the theoretical contents of 31.79, 2.33 and 23.47 percent.

*Example 11.—N,N-bis[β-(p-tolylsulfonylthio)ethyl]-cyclohexylamine hydrochloride*

Bis(2 - chloroethyl)cyclohexylamine hydrochloride (31.3 grams; 0.120 mole) and potassium p-toluenethiosulfonate (54.4 grams; 0.240 mole) were dispersed with stirring in 500 milliliters ethanol. The resulting reaction mixture was heated at the boiling temperature and under reflux for 5 hours. Following the heating period, the product was separated from the reaction mixture as described in Example 10. The crude crystalline product thus obtained was recrystallized from ethanol to give up the N,N-bis[β-(p-tolylsulfonylthio)ethyl]cyclohexylamine hydrochloride product melting at 92–99° C. and having carbon, hydrogen and nitrogen contents of 50.91, 6.29 and 2.23 percent, respectively, as compared to theoretical contents of 51.09, 6.07 and 2.48 percent.

*Example 12.—N,N-bis[β-(4-bromophenylsulfonylthio)-ethyl]cyclooctylamine*

A mixture of bis(2-chloroethyl)cyclooctylamine (9.40 grams; 0.0372 mole) and potassium p-bromobenzenethiosulfonate (21.7 grams; 0.0744 mole) in 50 milliliters of dimethylformamide was heated at 90° for 1½ hours. Following the heating period the reaction mixture was filtered to remove the potassium chloride by-product. The filtered reaction mixture was then diluted with ice water to initiate the precipitation of the solid product. The solid product, recrystallized from acetonitrile, gave the N,N-bis[β-(4-bromophenylsulfonylthio)ethyl]cyclooctylamine product melting at 113–115° C. and having carbon, hydrogen and nitrogen contents of 41.82, 4.24 and 2.00 percent, respectively, as compared to the theoretical contents of 42.04, 4.56 and 2.04 percent.

In a similar manner, the following novel compounds of the present invention are prepared.

β,β' - bis(pentamethylphenylsulfonylthio)diethyl ether (molecular weight of 559) by reacting together β,β'-dibromodiethyl ether and potassium pentamethylbenzenethiosulfonate.

Bis[2 - (3,5-dimethylphenylsulfonylthio)ethyl] sulfide (molecular weight of 491) by reacting together β,β'-dichlorodiethyl sulfide and sodium 3,5-dimethylbenzenethiosulfonate.

β,β'-bis(phenylsulfonylthio)diethyl ether (melting at 73.5°–75.0° C. and having carbon, hydrogen and sulfur contents of 45.87, 4.30 and 30.87 percent, respectively, as compared with the theoretical contents of 45.91, 4.33 and 30.64) by reacting together β,β'-dibromodiethyl ether and potassium benzenethiosulfonate.

Bis[2-(2,4,6-tribromophenylsulfonylthio)ethyl] sulfide (molecular weight of 908) by reacting together β,β'-dibromodiethyl sulfide and potassium 2,4,6-tribromobenzenethiosulfonate.

Bis[2-(n-butylsulfonylthio)ethyl] sulfide (molecular weight of 395) by reacting together β,β'-dibromodiethyl sulfide and potassium n-butanethiosulfonate.

Bis[2-(2,4,5-trichlorophenylsulfonylthio)ethyl] sulfide (molecular weight of 641) by reacting together β,β'-dichlorodiethyl sulfide and sodium 2,4,5-trichlorobenzenethiosulfonate.

N,N - bis[β-(methylsulfonylthio)ethyl]-n-dodecylamine (melting at 48–50° C. and having carbon, hydrogen and sulfur contents of 46.94, 8.59 and 27.48, respectively, as compared to the theoretical values of 46.82, 8.51 and 27.77 percent) by reacting together bis-(2-chloroethyl)-n-dodecylamine and potassium methanethiosulfonate.

β,β' - bis(4 - chloro-2-methylphenylsulfonylthio)-diethyl ether (molecular weight of 516) by reacting together β,β'-dibromodiethyl ether and potassium 4-chloro-2-methylbenzenethiosulfonate.

N,N - bis[β-(3,4,5-trimethylphenylsulfonylthio)-ethyl]-ethylamine (molecular weight of 530) by reacting together bis(2-bromoethyl)ethylamine and sodium 3,4,5-trimethylbenzenethiosulfonate.

N,N - bis[β-(benzylsulfonylthio)ethyl]-tert.-butylamine (melting at 103°–105° C. and having carbon, hydrogen and nitrogen contents of 52.72, 6.34 and 2.57 percent, respectively, as compared with the theoretical contents of 52.66, 6.23 and 2.79 percent) by reacting together bis(2-bromoethyl)-tert.-butylamine and potassium phenylmethanethiosulfonate.

N,N - bis[β-(methylsulfonylthio)ethyl]-tert.-butylamine hydrochloride (melting at 174°–175° C. and having carbon, hydrogen and nitrogen contents of 31.15, 6.20 and 3.59 percent, respectively, as compared to the theoretical contents of 31.11, 6.27 and 3.63 percent) by reacting together bis(2-chloroethyl)-tert.-butylamine hydrochloride and potassium methanethiosulfonate.

N,N - bis[β-(2,5-diethylphenylsulfonylthio)ethyl]amine (molecular weight of 530) by reacting together β,β'-dibromodiethylamine and potassium 2,5-diethylbenzenethiosulfonate.

N,N-bis[β-(p-n-butylphenylsulfonylthio)ethyl]-n-hexylamine (molecular weight of 614) by reacting together bis(2-bromoethyl)-n-hexylamine and sodium p-n-butylbenzenethiosulfonate.

N,N - bis[β - (2,5 - dichlorophenylsulfonylthio)ethyl]-n-hexylamine (molecular weight 640) by reacting together bis(2-chloroethyl)-n-hexylamine and potassium 2,5-dichlorobenzenethiosulfonate.

N,N - bis[β-(methylsulfonylthio)ethyl]amine (melting at 67.5°–68.5° C. and having carbon, hydrogen and nitrogen contents of 24.92, 5.35 and 5.18 percent, respectively, as compared to the theoretical contents of 24.56, 5.15 and 4.77 percent) by reacting together β,β'-dibromodiethylamine and potassium methanethiosulfonate.

N,N - bis[β-(phenylsulfonylthio)ethyl]-tert.-butylamine (melting at 90°–92° C. and having carbon, hydrogen and nitrogen contents of 50.71, 5.86 and 2.97 percent, respectively, as compared to the theoretical contents of 50.71, 5.75 and 2.96 percent) by reacting together bis(2-chloroethyl)-tert.-butylamine and potassium benzenethiosulfonate.

N,N-bis[β-(2,6-dichloro-4-isopropylphenylsulfonylthio)ethyl]amine hydrobromide (molecular weight of 720) by reacting together β,β'-dibromodiethylamine hydrobromide and sodium 2,6-dichloro-4-isopropylbenzenethiosulfonate.

N,N - bis[β-(methylsulfonylthio)ethyl]-tert.-butylamine (melting at 72.5°–75.5° C. and having carbon, hydrogen and nitrogen contents of 34.08, 6.65 and 4.02 percent, respectively, as compared to the theoretical contents of 34.36, 6.63 and 4.01 percent) by reacting together bis(2-chloroethyl)-tert.-butylamine and potassium methanethiosulfonate.

Bis[2 - (2,5 - dimethylphenylsulfonylthio)ethyl]sulfide (refractive index n/D 1.6147 at 25° C. and having carbon, hydrogen and sulfur contents of 48.98, 5.40 and 33.00 percent, respectively, as compared to the theoretical contents of 48.95, 5.34 and 32.67 percent) by reacting together β,β'-dibromodiethylsulfide and potassium 2,5-dimethylbenzenethiosulfonate.

N,N - bis[β-(p-tolylsulfonylthio)ethyl]-tert.-butylamine (melting at 87.5°–89° C. and having carbon, hydrogen and nitrogen contents of 52.98, 6.17 and 2.77 percent, respectively, as compared to the theoretical contents of 52.66, 6.23 and 2.79 percent) by reacting together bis(2-chloroethyl)-tert.-butylamine and potassium p-toluenethiosulfonate.

N,N - bis[β - (methylsulfonylthio)ethyl]methylamine (melting at 144°–146° C. and having carbon, hydrogen and sulfur contents of 27.40, 5.24 and 41.97 percent, respectively, as compared to the theoretical contents of 27.34, 5.57 and 41.71 percent) by reacting together bis(2-chloroethyl)methylamine and potassium methanethiosulfonate.

β,β' - bis(2,5-dimethylphenylsulfonylthio)diethyl ether (melting at 77°–79° C. and having carbon, hydrogen and sulfur contents of 50.82, 5.65 and 27.14 percent, respectively, as compared to the theoretical contents of 50.61, 5.52 and 27.02 percent) by reacting together β,β'-dibromodiethyl ether and potassium 2,5-dimethylbenzenethiosulfonate.

Bis[2-(p-bromophenylsulfonylthio)ethyl]sulfide (melting at 89°–91° C. and having carbon, hydrogen and sulfur contents of 32.55, 2.56 and 27.11 percent, respectively, as compared to the theoretical contents of 32.44, 2.72 and 27.06 percent) by reacting together β,β'-dibromodiethyl sulfide and potassium p-bromobenzenethiosulfonate.

Bis[2 - (methylsulfonylthio)ethyl]sulfide (melting at 77°–78° C. and having carbon, hydrogen and sulfur contents of 23.39, 4.56 and 51.63 percent, respectively, as compared to the theoretical contents of 23.21, 4.54 and 51.63 percent) by reacting together potassium methanethiosulfonate and β,β'-dibromodiethyl sulfide.

Bis[2 - (phenylsulfonylthio)ethyl]sulfide (melting at 75°–77° C. and having carbon and hydrogen contents of 44.22 and 4.45 percent, respectively, as compared to the theoretical contents of 44.22 and 4.17 percent) by reacting together potassium benzenethiosulfonate and β,β'-dibromodiethyl sulfide.

Bis[2 - (p-tolylsulfonylthio)ethyl]sulfide (melting at 55.5°–56.5° C. and having carbon, hydrogen and sulfur contents of 46.80, 4.70 and 34.75 percent, respectively, as compared to the theoretical contents of 46.73, 4.79 and 34.65 percent) by reacting together potassium p-toluenethiosulfonate and β,β'-dibromodiethyl sulfide.

N,N - bis[β-(methylsulfonylthio)ethyl]aniline (melting at 120–123° C. and having carbon, hydrogen, nitrogen and sulfur contents of 39.28, 5.13, 3.76 and 34.63 percent, respectively, as compared to the theoretical contents of 39.00, 5.18, 3.79 and 34.70 percent) by reacting together N,N-bis(2-bromoethyl)aniline and potassium methanethiosulfonate.

Bis[2-ethylsulfonylthio)ethyl]sulfide (molecular weight of 339) by reacting together β,β'-dibromodiethyl sulfide and sodium ethanethiosulfonate.

Bis[2 - (3,5 - dichloro - 4 - methylphenylsulfonylthio)-ethyl]sulfoxide (molecular weight of 616) by reacting together potassium 3,5-dichloro-4-methylbenzenethiosulfonate and β,β'-dibromodiethyl sulfoxide.

Bis[2-(phenylsulfonylthio)ethyl]sulfoxide (melting at 78–80° C. and having carbon, hydrogen and sulfur contents of 42.61, 3.98 and 35.62 percent, respectively, as compared to theoretical contents of 42.64, 4.03 and 35.57 percent) by reacting together potassium benzenethiosulfonate and β,β'-dibromodiethyl sulfoxide.

Bis[2-(p-iodophenylsulfonylthio)ethyl]sulfoxide (molecular weight of 702) by reacting together sodium p-iodobenzenethiosulfonate and β,β'-dibromodiethyl sulfoxide.

Bis[2 - (p - bromophenylsulfonylthio)ethyl]sulfoxide (melting at 124–126° C. and having carbon, hydrogen and sulfur contents of 31.53, 2.68 and 26.17 percent, respectively, as compared to theoretical contents of 31.58, 2.65 and 26.35 percent) by reacting together potassium p-bromobenzenethiosulfonate and β,β'-dibromodiethyl sulfoxide.

Bis[2 - (3,5 - diethylphenylsulfonylthio)ethyl]sulfoxide (molecular weight of 563) by reacting together potassium 3,5-diethylbenzenethiosulfonate with β,β'-dibromodiethyl sulfoxide.

Bis[2 - (3,4,5 - trimethylphenylsulfonylthio)ethyl]sulfoxide (molecular weight of 535) by reacting together potassium 3,4,5-trimethylbenzenethiosulfonate with β,β'-dibromodiethyl sulfoxide.

Bis[2 - (2 - chloro - 4 - isopropylphenylsulfonylthio)-ethyl]sulfoxide (molecular weight of 604) by reacting together sodium 2-chloro-4-isopropylbenzenethiosulfonate and β,β'-dibromodiethyl sulfoxide.

Bis[2 - (p - fluorophenylsulfonylthio)ethyl]sulfoxide (melting at 98–100.5° C. and having carbon, hydrogen and sulfur contents of 39.64, 3.32 and 33.02 percent, respectively, as compared to the theoretical contents of 39.49, 3.31 and 32.94 percent) by reacting potassium p-fluorobenzenethiosulfonate and β,β'-dibromodiethyl sulfoxide.

Bis[2 - (2,4,5 - trichlorophenylsulfonylthio)ethyl]sulfoxide (molecular weight of 657) by reacting together potassium 2,4,5-trichlorobenzenethiosulfonate with β,β'-dibromodiethyl sulfoxide.

Bis[2-(2,4,6-tribromophenylsulfonylthio)ethyl] sulfoxide (molecular weight of 924) by reacting together potassium 2,4,6-tribromobenzenethiosulfonate and β,β'-dibromodiethyl sulfoxide.

Bis[2-(pentachlorophenylsulfonylthio)ethyl] sulfoxide (molecular weight of 795) by reacting together potassium pentachlorobenzenethiosulfonate with β,β'-dibromodiethyl sulfoxide.

Bis[2-(3,4-dichlorophenylsulfonylthio)ethyl] sulfoxide (melting at 127.5–129° C. and having a carbon, hydrogen and sulfur content of 32.60, 2.53 and 26.98 percent, respectively, as compared to theoretical contents of 32.66, 2.40 and 27.24 percent) by reacting together potassium 3,4-dichlorobenzenethiosulfonate and β,β'-dibromodiethyl sulfoxide.

Bis[2-(4-ethylphenylsulfonylthio)ethyl] sulfoxide (molecular weight of 507) by reacting together sodium 4-ethylbenzenethiosulfonate and β,β'-dibromodiethyl sulfoxide.

Bis[2-(methylsulfonylthio)ethyl] sulfone (melting at 123.5–124.5° C. and having carbon, hydrogen and sulfur contents of 21.30, 3.94 and 47.09 percent, respectively, as compared to the theoretical contents of 21.04, 4.12 and 46.80 percent) by reacting together potassium methanethiosulfonate and bis(2-bromoethyl)-sulfone.

Bis[2-(ethylsulfonylthio)ethyl] sulfone (melting at 101–102° C. and having carbon, hydrogen and sulfur contents of 26.13, 4.71 and 43.45 percent, respectively, as compared to the theoretical contents of 25.93, 4.90 and 43.26 percent) by reacting together potassium ethanethiosulfonate and bis(2-bromoethyl)sulfone.

Bis[2-(n-butylsulfonylthio)ethyl] sulfone (melting at 99–99.5° C. and having carbon, hydrogen and sulfur contents of 33.99, 5.97 and 37.88 percent, respectively, as compared to the theoretical contents of 33.78, 6.14 and 37.57 percent) by reacting together potassium n-butanethiosulfonate and bis(2-bromoethyl)sulfone.

Bis[2-(phenylsulfonylthio)ethyl] sulfone (melting at 144–146° C. and having carbon, hydrogen and sulfur contents of 41.40, 3.70 and 34.16 percent, respectively, as compared to the theoretical contents of 41.18, 3.89 and 34.35 percent) by reacting together potassium benzenethiosulfonate and bis(2-bromoethyl)sulfone.

Bis[2-(4-methoxyphenylsulfonylthio)ethyl] sulfone (an oil having carbon, hydrogen and sulfur contents of 41.25, 3.93 and 30.27 percent, respectively, as compared to the theoretical contents of 41.05, 4.21 and 30.44 percent) by reacting potassium 4-methoxybenzenethiosulfonate and bis(2-bromoethyl)sulfone. The infrared spectrum showed 2 strong bands at 1150 cm.$^{-1}$ and 1340 cm.$^{-1}$, thus indicating the presence of the thiosulfonate group.

N,N - bis[β-(methylsulfonylthio)ethyl]cyclohexylamine hydrochloride (melting at 127.5–129° C. and having carbon, hydrogen and nitrogen contents of 35.03, 6.42 and 3.50 percent, respectively, as compared to the theoretical contents of 34.98, 6.36 and 3.40 percent) by reacting together bis(2-chloroethyl)cyclohexylamine hydrochloride and potassium methanethiosulfonate.

N,N - bis[β-(methylsulfonylthio)ethyl]cyclohexylamine (melting at 80–82° C. and having carbon, hydrogen and nitrogen contents of 38.71, 6.69 and 3.96 percent, respectively, as compared to the theoretical contents of 38.37, 6.71 and 3.73 percent) by reacting together N,N-bis[β-(methylsulfonylthio)ethyl]cyclohexylamine hydrochloride and sodium bicarbonate.

N,N - bis[β-(p-tolylsulfonylthio)ethyl]cyclohexylamine (melting at 115.5–117.5° C. and having carbon, hydrogen and nitrogen contents of 54.69, 6.42 and 2.61 percent, respectively, as compared to the theoretical contents of 54.62, 6.30 and 2.65 percent) by reacting bis(2-chloroethyl)cyclohexylamine and potassium p-toluenethiosulfonate.

N,N - bis[β-(phenylsulfonylthio)ethyl]cyclohexylamine (melting at 72–74° C. and having carbon, hydrogen and nitrogen contents of 53.26, 5.99 and 2.67 percent, respectively, as compared to the theoretical contents of 52.88, 5.85 and 2.80 percent) by reacting bis(2-chloroethyl)cyclohexylamine and potassium benzenethiosulfonate.

N,N - bis[β-(3,4-dichlorophenylsulfonylthio)ethyl]cyclohexylamine (melting at 153–154.5° C. and having carbon, hydrogen and nitrogen contents of 41.74, 3.98 and 1.97 percent, respectively, as compared to the theoretical contents of 41.45, 3.95 and 2.20 percent) by reacting together bis(2-chloroethyl)cyclohexylamine and potassium 3,4-dichlorobenzenethiosulfonate.

N,N - bis[β-(n-butylsulfonylthio)ethyl]cyclohexylamine hydrochloride (melting at 152–154° C. and having carbon, hydrogen and nitrogen contents of 43.31, 7.40 and 2.82 percent, respectively, as compared to the theoretical contents of 43.57, 7.72 and 2.82 percent) by reacting bis(2-chloroethyl)cyclohexylamine hydrochloride and potassium n-butanethiosulfonate.

N,N - bis[β-(methylsulfonylthio)ethyl]cyclooctylamine (melting at 72–74° C. and having carbon, hydrogen and nitrogen contents of 41.79, 7.30 and 3.33 percent, respectively, as compared to the theoretical contents of 41.66, 7.24 and 3.47 percent) by reacting bis(2-chloroethyl)cyclooctylamine and potassium methanethiosulfonate.

N,N - bis[β-(methylsulfonylthio)ethyl]cyclooctylamine hydrochloride (melting at 156.5–158° C. and having carbon, hydrogen and nitrogen contents of 38.18, 6.60 and 3.07 percent, respectively, as compared to the theoretical contents of 38.21, 6.87 and 3.18 percent) by reacting bis(2-chloroethyl)cyclooctylamine hydrochloride and potassium methanethiosulfonate.

N,N - bis[β - ethylsulfonylthio)ethyl]cyclooctylamine (melting at 48–49° C. and having carbon, hydrogen and nitrogen contents of 44.64, 7.75 and 3.50 percent, respectively, as compared to the theoretical contents of 44.52, 7.70 and 3.25 percent) by reacting bis(2-chloroethyl)cyclooctylamine and potassium ethanethiosulfonate.

N,N-bis[β - (phenylsulfonylthio)ethyl]cyclooctylamine (melting at 69–71° C. and having carbon, hydrogen and nitrogen contents of 54.43, 6.21 and 2.61 percent, respectively, as compared to the theoretical contents of 54.62, 6.30 and 2.65 percent) by reacting bis(2-chloroethyl)cyclooctylamine and potassium benzenethiosulfonate.

N,N-bis[β - (p-tolysulfonylthio)ethyl]cyclooctylamine (melting at 105–106.5° C. and having carbon, hydrogen and nitrogen contents of 55.80, 6.40 and 2.42 percent, respectively, as compared with the theoretical contents of 56.18, 6.71 and 2.52 percent) by reacting bis(2-chloroethyl)cyclooctylamine and potassium p-toluenethiosulfonate.

N,N-bis[β - (4 - bromophenylsulfonylthio)ethyl]cyclooctylamine hydrochloride (as colorless crystals decomposing at 165.5° C. and having carbon, hydrogen and nitrogen contents of 39.65, 4.37 and 2.30 percent, respectively, as compared with the theoretical contents of 39.92, 4.47 and 1.94 percent) by reacting bis(2-chloroethyl)cyclooctylamine hydrochloride and potassium p-bromobenzenethiosulfonate.

N,N-bis[β-(2,5 - dimethylphenylsulfonylthio)ethyl]cyclooctylamine hydrochloride (as colorless crystals melting with decomposition at 133–135° C. and having carbon, hydrogen and nitrogen contents of 53.89, 6.89 and 2.44 percent, respectively, as compared with the theoretical contents of 54.21, 6.83 and 2.26 percent) by reacting bis-(2-chloroethyl)cyclooctylamine hydrochloride and potassium 2,5-dimethylbenzenethiosulfonate.

N,N-bis[β - (methylsulfonylthio)ethyl]-n-dodecylamine (melting at 50.5–53° C. and having carbon, hydrogen and sulfur contents of 46.94, 8.59 and 27.48 percent, respectively, as compared to the theoretical contents of 46.82, 8.51 and 27.77 percent) by reacting bis(2-chloroethyl)-n-dodecylamine and potassium methanethiosulfonate.

N,N-bis[β - (p-tolylsulfonylthio)ethyl]-n-dodecylamine (as an oil, $n_D^{25}$ 1.5305, and having carbon, hydrogen and nitrogen contents of 58.50, 7.97 and 2.46 percent, respectively, as compared to the theoretical values of 58.69, 7.72 and 2.28 percent, respectively) by reacting together bis(2-chloroethyl)-n-dodecylamine hydrochloride and potassium p-toluenethiosulfonate.

N,N-bis[β - (methylsulfonylthio)ethyl]bicyclo-[2.2.1.]-5-hepten-2-ylmethylamine hydrochloride (melting with decomposition at 73° C. and having carbon, hydrogen and nitrogen contents of 38.24, 5.71 and 3.09 percent, respectively, as compared to the theoretical contents of 38.56, 6.01 and 3.21 percent) by reacting together bis(2-chloroethyl)bicyclo[2.2.1.]-5 - hepten-2-ylmethylamine hydrochloride and potassium methanethiosulfonate.

N,N-bis[β-(methylsulfonylthio)ethyl] - 2,6 - dimethylaniline (melting at 77.5–79.5° and having carbon, hydrogen and sulfur contents of 42.56, 5.79 and 32.09 percent, respectively, as compared to the theoretical contents of 42.29, 5.83 and 32.26 percent) by reacting together N,N-bis(2-bromoethyl) - 2,6 - dimethylaniline and potassium methanethiosulfonate.

N,N - bis[β - (methylsulfonylthio)ethyl]-p-methoxyaniline (melting at 98.5–99° C. and having carbon, hydrogen and nitrogen contents of 39.42, 5.38 and 3.35 percent, respectively, as compared to the theoretical contents of 39.08, 5.30 and 3.35 percent) by reacting together N,N-bis(2-bromoethyl)-p-anisidine and potassium methanethiosulfonate.

N,N-bis[β - (phenylsulfonylthio)ethyl]-p-chloroaniline (molecular weight 528) by reacting together N,N-bis(2-bromoethyl)-p-chloroaniline and potassium benzenethiosulfonate.

N,N-bis[β-(n-butylsulfonylthio)ethyl] - 3,5 - dibromoaniline (molecular weight 611) by reacting together N,N-bis(2-bromoethyl)-3,5-dibromoaniline and potassium n-butanethiosulfonate.

The compounds of the present invention or compositions containing the same, can be applied to pests and their habitats and food in parasiticidal amounts to obtain excellent controls and kills of many organisms. In further operations, the compounds or formulations containing the same can be applied to seeds to protect the seeds from the organisms of rot and damping off. Also, the compounds can be employed as slimicides in the white water in paper mills or the water employed in cooling towers. Additionally, the compounds can be included in inks, adhesives, soaps, cutting oils, high energy fuels or oil or latex paints to prevent mold and mildew, and the degradation of such products resulting from microbial attack. Further, the compounds can be distributed in textiles or cellulosic materials, or can be employed in the impregnation of wood and lumber to preserve and protect such products from the attack of the fungal agents of rot, mold, mildew and decay.

The compounds conveniently can be employed in liquid or dust compositions. In such usage, the compounds are modified with one or a plurality of adjuvants or helpers including water, organic solvents, petroleum oils, petroleum distillates, naphthas or other liquid carriers, surface active dispersing agents and finely divided solids such as chalk, talc or bentonite. Depending upon the concentration of the parasiticide compounds in such formulations, the augmented compositions are adapted to be distributed on plant or plant parts, or in soil, inks, adhesives, cutting oils, high energy fuels, paints, textiles, paper, lumber, white or cooling waters, or to be employed as concentrates and subsequently diluted with additional liquid or solid adjuvants to produce the ultimate treating compositions.

The exact concentration of the novel compounds to be employed in the treating compositions is not critical and may vary considerably provided the required amount of effective agent is supplied on the plant or plant part or in the soil, ink, adhesive, cutting oil, high energy fuel, textile, paper, wood and so forth. The concentration of toxicant in liquid compositions generally is from about 1 to 50 percent by weight. Concentrations up to 95 percent by weight oftentimes are conveniently employed. In dusts, the concentration of the toxicant can be from about 1 to 10 percent by weight. In compositions to be employed as concentrates, the toxicant can be present in a concentration of from 5 to 98 percent by weight.

In representative operations, $\beta,\beta'$-bis(phenylsulfonylthio)diethyl ether, $\beta,\beta'$-bis(p-tolylsulfonylthio)diethyl ether, bis[2-(methylsulfonylthio)ethyl]sulfide and N,N-bis[$\beta$-(ethylsulfonylthio)ethyl]-tert.-butylamine each give complete controls of *Aerobacter aerogenes, Pseudomonas aeruginosa, Salmonella typhosa* and *Staphylococcus aureus* at concentrations of 1000 parts per million by weight. In further operations, $\beta,\beta'$-bis(methylsulfonylthio)diethyl ether gives excellent controls of late blight when used in aqueous composition containing 500 parts per million by weight of the ether compound. In other operations, aqueous compositions containing N,N-bis[$\beta$-(phenylsulfonylthio)ethyl]cyclooctylamine at a concentration of 500 parts per million by weight give complete kills of bacterium fire blight, *Bacillus cereus* and *Staphylococcus aureus*.

The thiosulfonates employed as starting materials in accordance with the teachings of the present invention can be prepared in accordance with known methods. In one method, potassium hydrosulfide (KSH) is reacted with a suitable lower alkane, benzene, methoxybenzene, halobenzene, lower alkylbenzene, phenyl methane, or lower alkyl-halobenzene sulfonyl halide such as the chloride or bromide. Representative halides include 3,5-dimethylbenzenesulfonyl chloride, 4-chloro-2-methylbenzenesulfonyl chloride, 2,4,5-trichlorobenzenesulfonyl bromide, n-propanesulfonyl chloride, n-butanesulfonyl chloride and 2-propanesulfonyl chloride. In a convenient procedure, the reaction is carried out by adding the sulfonyl halide to an aqueous or alcoholic potassium hydroxide solution saturated with $H_2S$. Upon completion of the reaction, the desired starting materials are separated by conventional procedures.

The $\beta,\beta'$-dibromodiethyl sulfide compound used as a starting material in accordance with the teachings of the present specification can be prepared by known procedures. In a convenient procedure, thiodiglycol is treated with concentrated aqueous hydrobromic acid for 75 minutes at 110° C. The reaction mixture is allowed to cool and is then washed with water to obtain the $\beta,\beta'$-dibromodiethyl sulfide. The $\beta,\beta'$-dibromodiethyl sulfide compound can then be oxidized to form the $\beta,\beta'$-dibromodiethyl sulfoxides and the $\beta,\beta'$-dibromodiethyl sulfones.

The $\beta,\beta'$-dihalo diethylamines and amine hydrohalides are also prepared by known procedures in which ammonia, an alkylamine such as tert.-butylamine, n-octylamine, n-heptylamine, bicyclo[2.2.1.]-5-hepten-2-ylmethylamine, ethylamine or aniline is reacted with ethylene oxide to obtain a $\beta,\beta'$-dihydroxydiethylamine intermediate. This intermediate is then converted to the dihalide by reaction with thionyl chloride, thionyl bromide, hydrogen chloride, hydrogen bromide, phosphorus tribromide or phosphorus oxychloride to produce the $\beta,\beta'$-dihalodiethylamine hydrohalide starting material. The free base starting materials are prepared by reacting the $\beta,\beta'$-dihalodiethylamine hydrohalide with an aqueous solution of alkali metal carbonate or hydroxide.

I claim:

1. The compound having the formula:

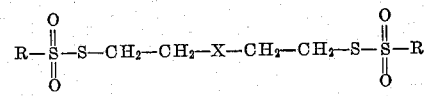

wherein R represents lower alkyl, phenyl, benzyl, halophenyl, methoxyphenyl, lower alkylphenyl or lower alkylhalophenyl and X represents oxygen, sulfur, SO, $SO_2$, N—$R_1$ or N—$R_1 \cdot R_2$ in which $R_1$ represents hydrogen, alkyl containing from 1 to 12 carbon atoms, inclusive, phenyl, halophenyl, lower alkyl phenyl, lower alkoxy phenyl, cyclohexyl, bicyclo[2.2.1.]-5-hepten-2-ylmethyl or cyclooctyl and $R_2$ represents hydrogen chloride, hydrogen bromide or hydrogen iodide.

2. $\beta,\beta'$-bis(p-tolylsulfonylthio)diethyl ether.
3. $\beta,\beta'$-bis(p-bromophenylsulfonylthio)diethyl ether.
4. Bis[2-(phenylsulfonylthio)ethyl]sulfoxide.
5. Bis[2-(2,5-dimethylphenylsulfonylthio)ethyl]sulfide.
6. N,N-bis[$\beta$-(ethylsulfonylthio)ethyl]tert.-butylamine.
7. Bis[2-(n-butylsulfonylthio)ethyl]sulfone.
8. N,N-bis[$\beta$-(methylsulfonylthio)ethyl]cyclohexylamine.
9. N,N-bis[$\beta$-(phenylsulfonylthio)ethyl]cyclooctylamine.
10. Bis[2-(methylsulfonylthio)ethyl]sulfide.
11. N,N-bis[$\beta$-(methylsulfonylthio)ethyl]cyclooctylamine.
12. N,N-bis[$\beta$-(methylsulfonylthio)ethyl]cyclooctylamine hydrochloride.

References Cited
UNITED STATES PATENTS 3,047,393   7/1962   Herz et al. _____ 260—453 X CHARLES B. PARKER, *Primary Examiner.*

JOSEPH P. BRUST, *Examiner.*